United States Patent
Sörvik et al.

(10) Patent No.: US 9,629,312 B2
(45) Date of Patent: Apr. 25, 2017

(54) MARKING DEVICE AND HARVESTING ARRANGEMENT

(75) Inventors: Bengt Sörvik, Uppsala (SE); Peter Camitz, Lidingö (SE)

(73) Assignee: Bengt Sörvik, Uppsala (SE)

( * ) Notice: Subject to any disclaimer, the term of this patent is extended or adjusted under 35 U.S.C. 154(b) by 1104 days.

(21) Appl. No.: 13/805,182

(22) PCT Filed: Jun. 9, 2011

(86) PCT No.: PCT/SE2011/050710
§ 371 (c)(1),
(2), (4) Date: Mar. 4, 2013

(87) PCT Pub. No.: WO2011/159226
PCT Pub. Date: Dec. 22, 2011

(65) Prior Publication Data
US 2013/0199670 A1    Aug. 8, 2013

(30) Foreign Application Priority Data

Jun. 18, 2010 (SE) ...................... 1000659

(51) Int. Cl.
| | | |
|---|---|---|
| *A01G 23/00* | (2006.01) | |
| *A01G 23/099* | (2006.01) | |
| *A01G 23/08* | (2006.01) | |

(52) U.S. Cl.
CPC .......... *A01G 23/099* (2013.01); *A01G 23/08* (2013.01)

(58) Field of Classification Search
CPC .......... A01G 23/099; B41K 1/08–1/12; B41K 5/02–5/026; B41F 19/02; B41J 1/06; B41J 1/58; B41J 1/04; B41J 3/28; B41J 3/38; B41J 3/385; B41J 3/4073; B44B 5/0076; B65B 61/26

See application file for complete search history.

(56) References Cited

U.S. PATENT DOCUMENTS 6,901,885 B1    6/2005    Kleinsasser

FOREIGN PATENT DOCUMENTS

| CA | 2721420 A1 * | 11/2009 | ............ A01G 23/08 |
|---|---|---|---|
| DE | 8914891 U1 | 4/1990 | |
| SE | 520289 C2 | 6/2003 | |
| SE | 532295 C2 | 12/2009 | |

* cited by examiner

*Primary Examiner* — Matthew G Katcoff
(74) *Attorney, Agent, or Firm* — Dilworth & Barrese, LLP

(57) ABSTRACT

The invention relates to a marking device (10) for applying a marking on an object. The marking device comprises a striking arm (11), which is provided with a striking head (12) at its outer free end, and actuating means (30) for actuating the striking arm (11). The striking arm is movably connected to a base (7) through a link arrangement (30). The striking arm is pivotable about a pivot axis (V1) under the effect of the actuating means and the link arrangement from a resting position to a striking position so as to thereby allow the striking head to hit against an object in order to apply a marking on the object. The link arrangement is arranged to move the pivot axis of the striking arm outwards so that the distance between this pivot axis and the base increases when the striking arm is pivoted from the resting position to the striking position.

20 Claims, 7 Drawing Sheets

US 9,629,312 B2

MARKING DEVICE AND HARVESTING ARRANGEMENT

FIELD OF THE INVENTION AND PRIOR ART

The present invention relates to a marking device according to the preamble of claim 1 and a harvesting arrangement for tree harvesting comprising such a marking device.

From WO 99/23873 A1 is previously known a system enabling a rational forest harvesting. According to one aspect of this system, the forest harvesting is carried out by means of a harvesting machine comprising a vehicle and a harvesting arrangement mounted thereon, the vehicle being provided with a computer arrangement adapted to register quality and/or size concerning harvested logs. In connection with the felling of a tree, the position of the harvesting machine is determined, for instance by means of a GPS equipment, and a log obtained from the tree is marked by a marking device with this position information or a code by means of which the log is associatable to the position information. The position information or the code applied on a log may be stored in a database associated with data concerning quality and/or size of the log in question. In this way, it will be possible to treat the logs as products having an identity of origin. For an efficient implementation of this type of system, there is a need for a marking device which makes it possible to apply an identification marking on a log in a simple and rapid manner in connection with the harvesting.

A marking device according to the preamble of claim 1 is previously known from WO 2009/134201 A1.

SUMMARY OF THE INVENTION

The object of the present invention is to provide a marking device of new and favourable design for applying a marking on an object, for instance on the end surface of a tree trunk.

According to the invention, this object is achieved by a marking device having the features herein; and According to the invention, the striking arm included in the marking device is pivotable about a pivot axis which is arranged to be moved outwards when the striking arm under the effect of the actuating means and link arrangement of the marking device is pivoted about this pivot axis from the resting position to the striking position so that the distance thereby is increased between this pivot axis and the base to which the marking device is mounted. The marking device can hereby be given a compact design with the striking arm in the resting position so that it can be located above the cutting member of a conventionally designed harvesting arrangement in a simple manner, at the same time as the striking arm is given the opportunity to hit with great power against the end surface of a tree trunk held by the gripping members of the harvesting arrangement directly after the moment when the tree trunk has been crosscut by means of the cutting member and without having to back the tree trunk backwards in the direction towards the marking device after the crosscutting.

Further advantages as well as advantageous features of the marking device of the present invention will appear from the following description and the dependent claims.

The invention also relates to a harvesting arrangement having the features herein.

Further advantages as well as advantageous features of the harvesting arrangement of the present invention will appear from the following description.

BRIEF DESCRIPTION OF THE DRAWINGS

With reference to the appended drawings, a specific description of preferred embodiments of the invention cited as examples follows below. In the drawings.

DETAILED DESCRIPTION OF PREFERRED EMBODIMENTS OF THE INVENTION

The marking device according to the present invention may be used in a harvesting arrangement in order to apply an identification marking on the end surface of a crosscut end of a tree trunk held by the gripping members of the harvesting arrangement. In the following, the marking device will be described with reference to this utilization. However, this utilization is only to be regarded as a non-limiting example and the marking device according to the invention may of course also be used for many other applications in order to apply a marking on a desired object, for instance in a saw mill in order to apply a marking on logs or boards.

Figure 1:
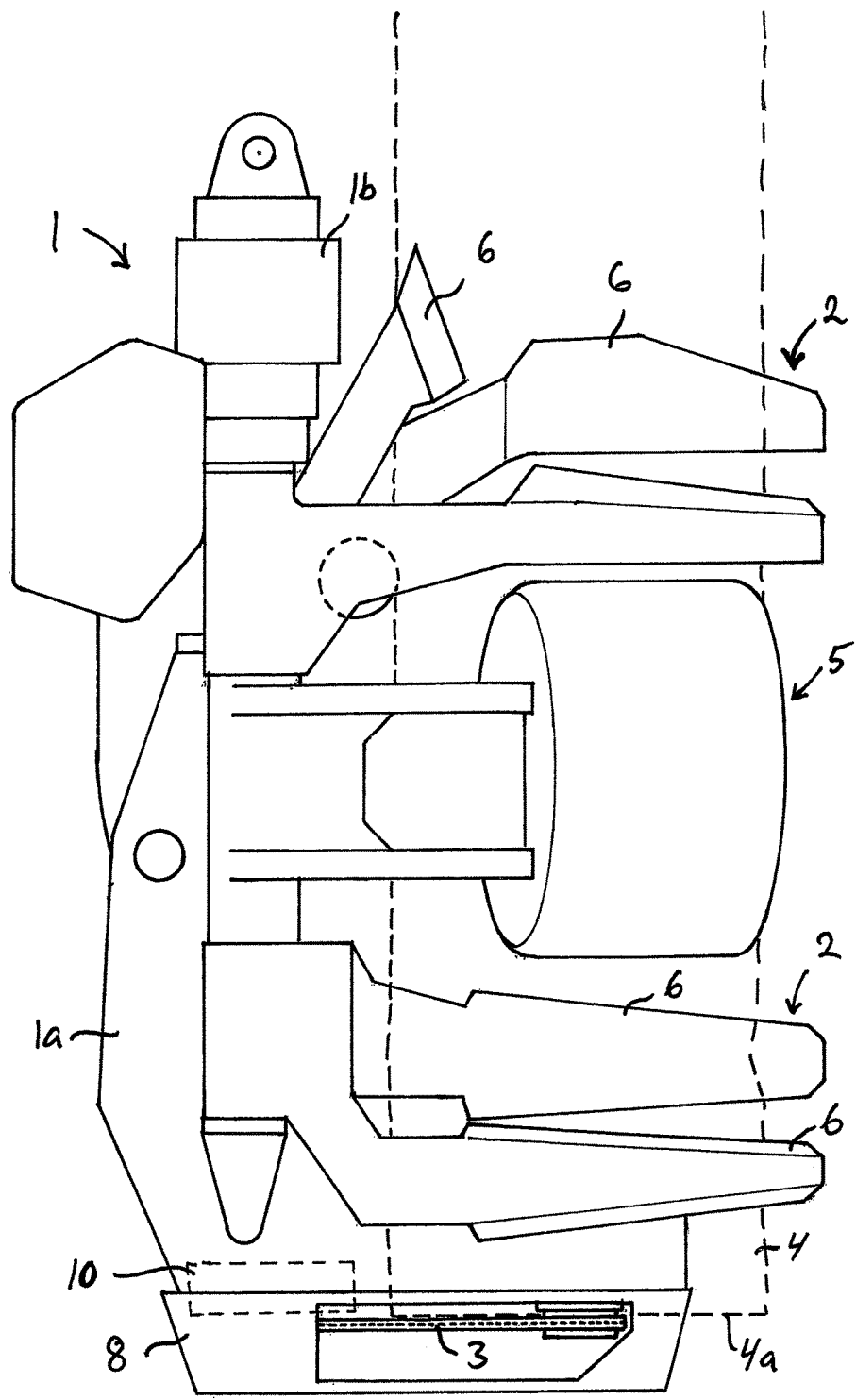
FIG. 1 is a schematic lateral view illustrating a harvesting arrangement provided with a marking device according to an embodiment of the present invention, with the harvesting arrangement seen in its position for holding a tree trunk in a vertical direction.

FIG. 1 schematically illustrates a harvesting arrangement 1 for tree harvesting according to an embodiment of the present invention. This harvesting arrangement 1 is in a conventional manner intended to be carried by a crane mounted to a forest vehicle. The forest vehicle may for instance constitute a harvester. In the illustrated example, the harvesting arrangement 1 is a so-called one grip harvesting arrangement, i.e. a harvesting arrangement adapted to grip a standing tree by means of gripping members 2, cut the tree by means of a cutting member 3, lay the tree trunk 4 down to an essentially horizontal position (see FIG. 2), and then by means of feeding means 5 drive the tree trunk through the harvesting arrangement while simultaneously delimbing the tree trunk by means of delimbing members 6. In the illustrated example, the delimbing members 6 consist of delimbing knives arranged on the gripping members 2. In the illustrated example, the feeding means 5 of the harvesting arrangement comprises two rotatably driven feeding wheels 5a, 5b adapted to come into engagement with the tree trunk on opposite sides thereof. The tree trunk 4 may be crosscut into individual logs by means of the cutting member 3. However, the invention is also applicable to a so-called full log handling, i.e. where the harvesting arrangement is utilized to cut the tree off and fell it, but whereupon no crosscutting of the tree trunk into smaller logs is carried out.

Figure 2:
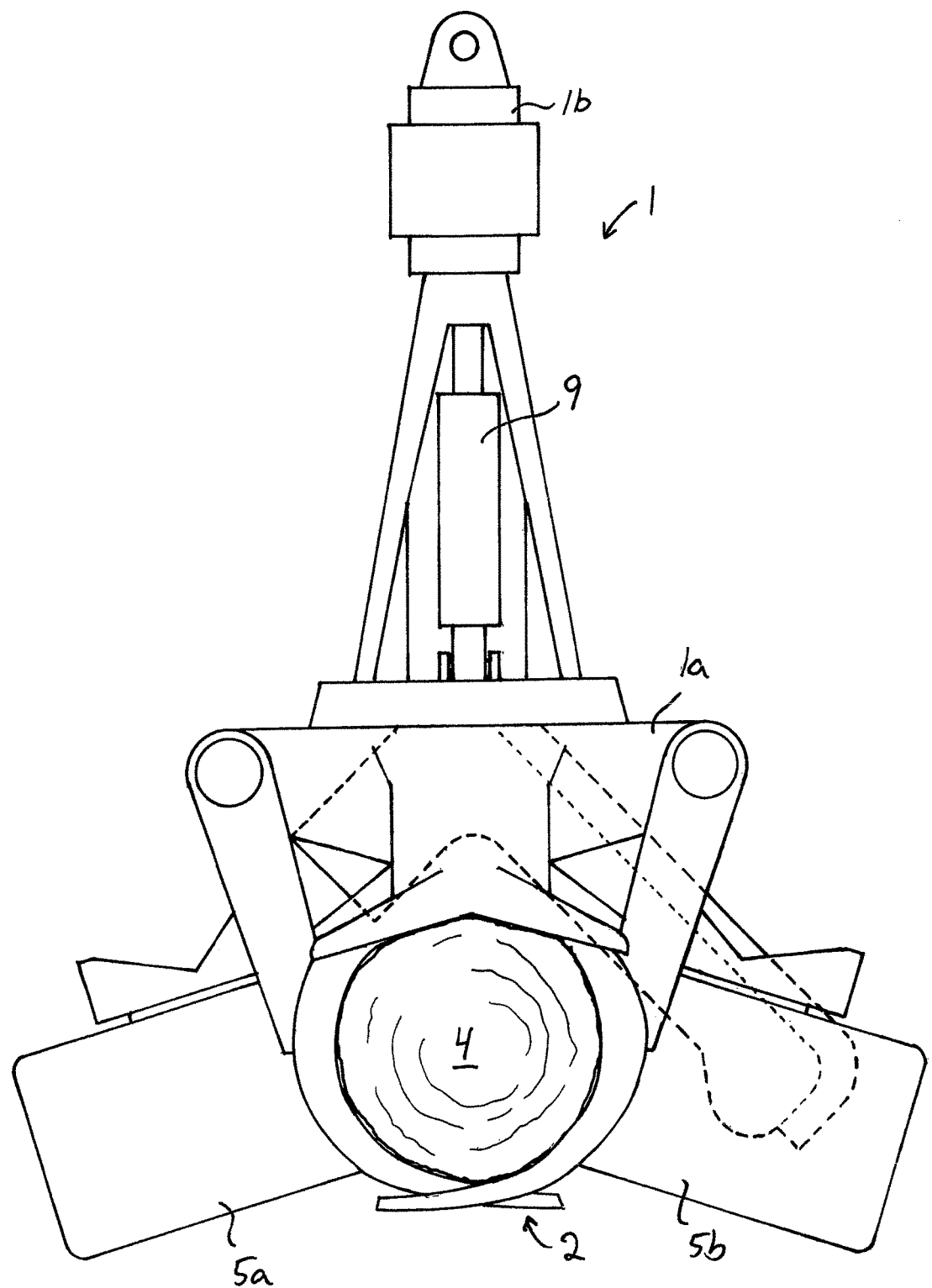
FIG. 2 is a schematic front view of the harvesting arrangement of FIG. 1, as seen in the position when the tree trunk has been turned to a horizontal position.
Figure 3C:
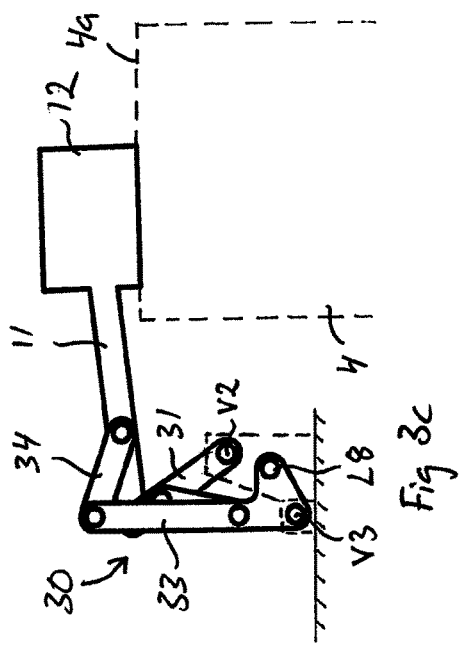
FIG. 3c shows the marking device of FIG. 3a with the striking arm in a striking position.
Figure 3B:
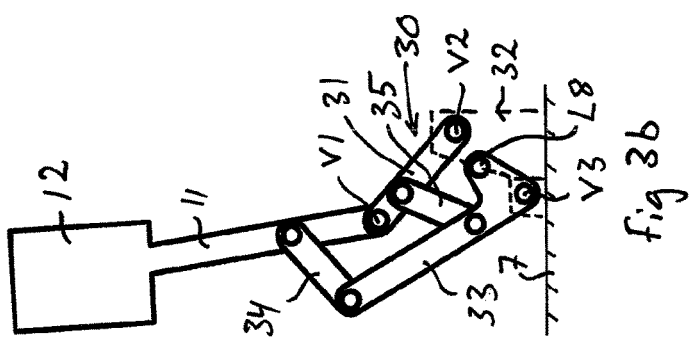
FIG. 3b shows the marking device of FIG. 3a with the striking arm in an intermediate position.
Figure 3A:
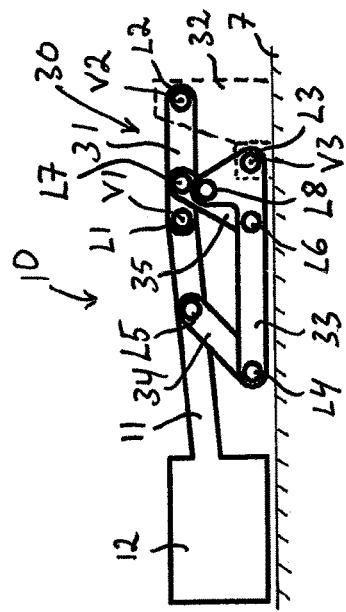
FIG. 3a is a schematic lateral view illustrating a marking device according to an embodiment of the present invention, as seen with the striking arm of the marking device in a resting position.
Figure 4B:
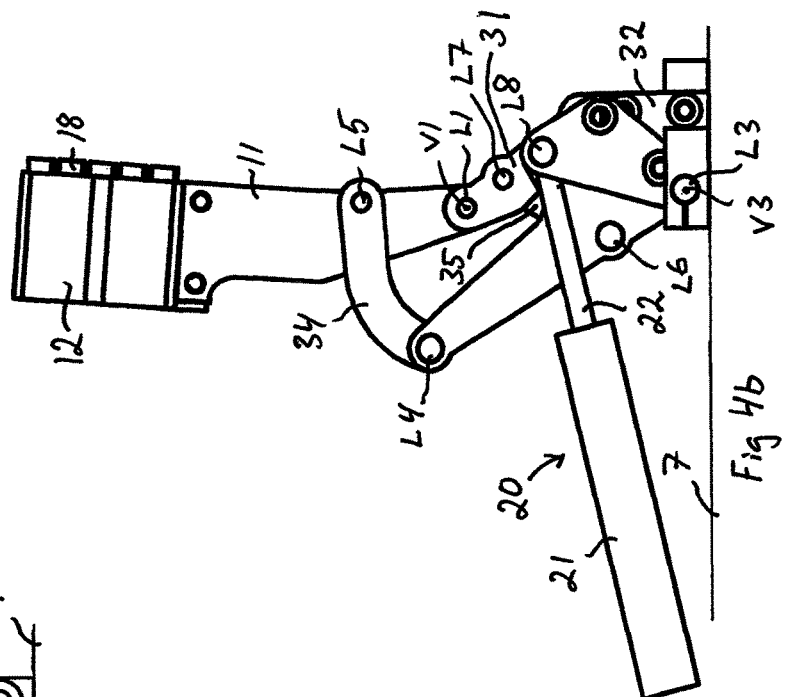
FIGS. 4a-4c are lateral views illustrating a marking device according to an embodiment of the present invention, shown with the striking arm of the marking device in positions corresponding to the positions shown in FIGS. 3a-3c, FIGS. 5a-5c are perspective views from the front of the marking device of FIGS. 4a-4c, shown with the striking arm of the marking device in positions corresponding to the positions shown in FIGS. 3a-3c, FIGS. 6a-6c are perspective views from below of the marking device of FIGS. 4a-4c, shown with the striking arm of the marking device in positions corresponding to the positions shown in FIGS. 3a-3c.
Figure 4A:
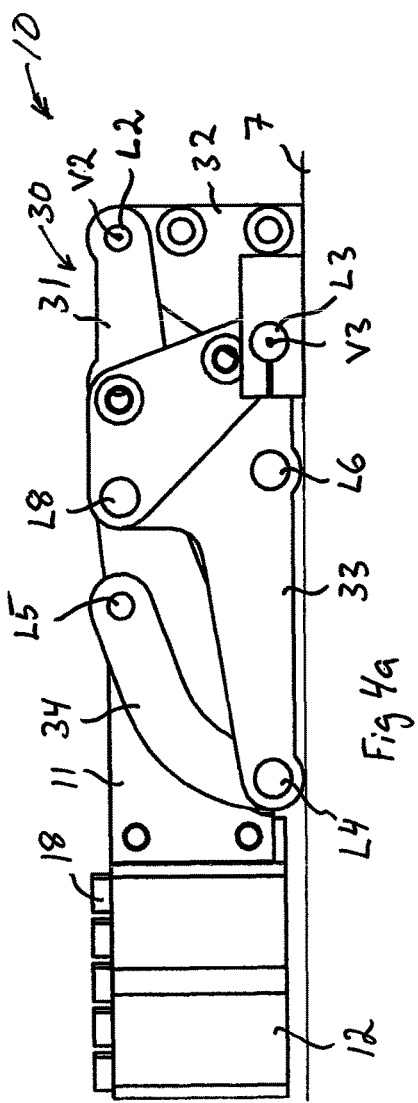
Figure 4C:
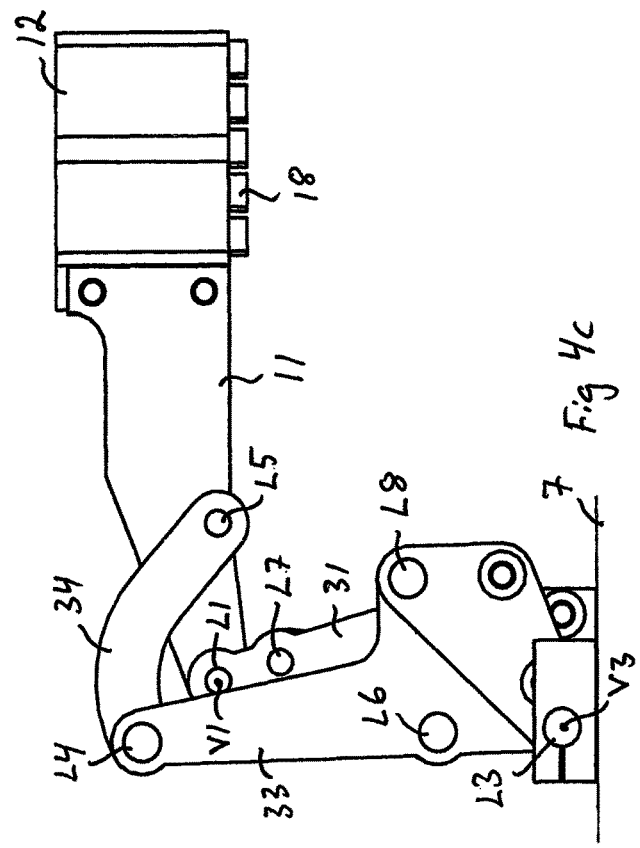
Figure 5A:
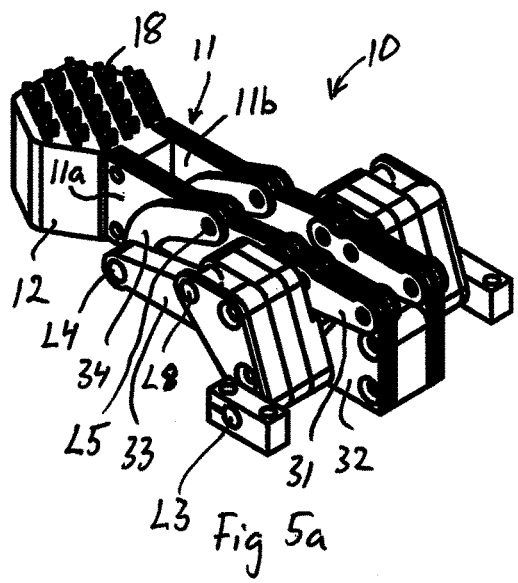
Figure 5B:
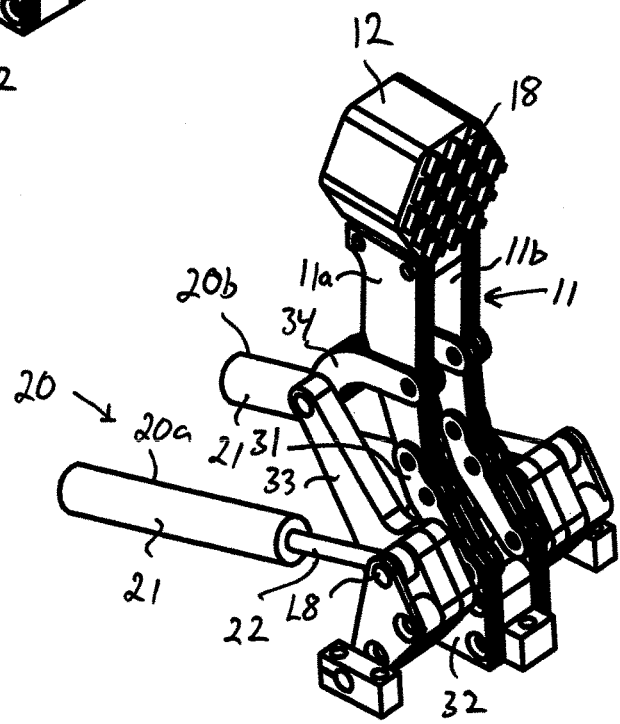
Figure 5C:
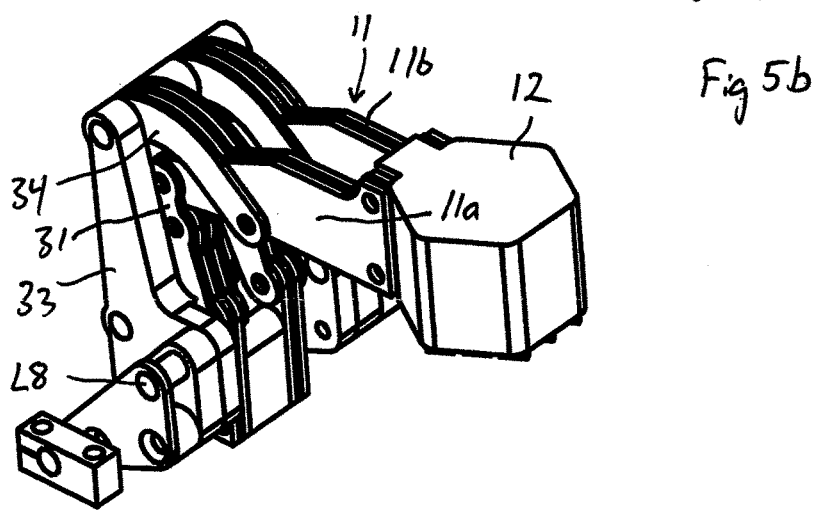
Figure 6A:
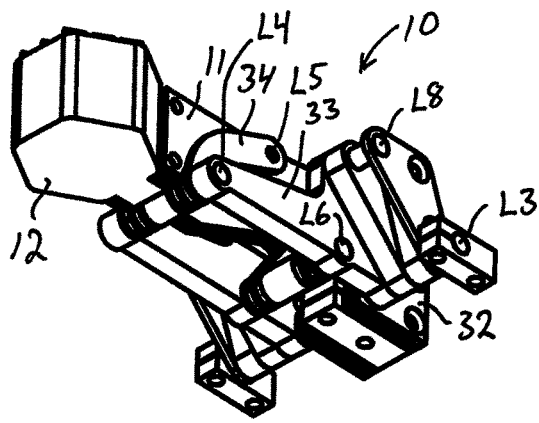
Figure 6B:
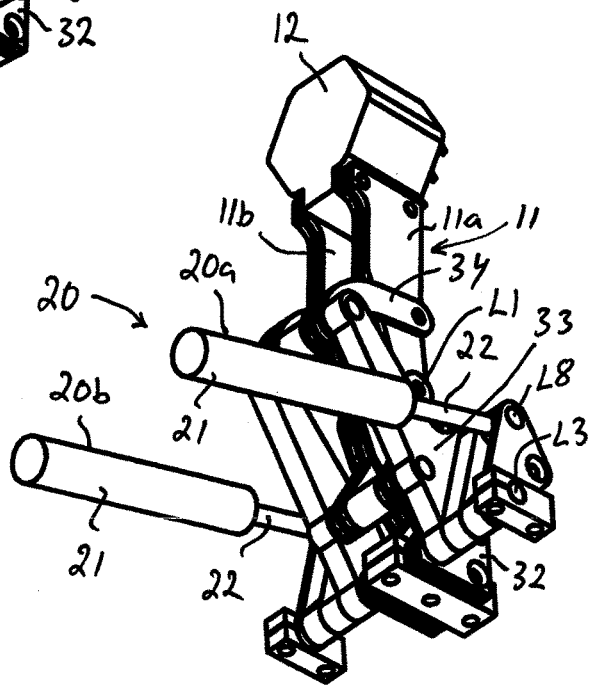
Figure 6C:
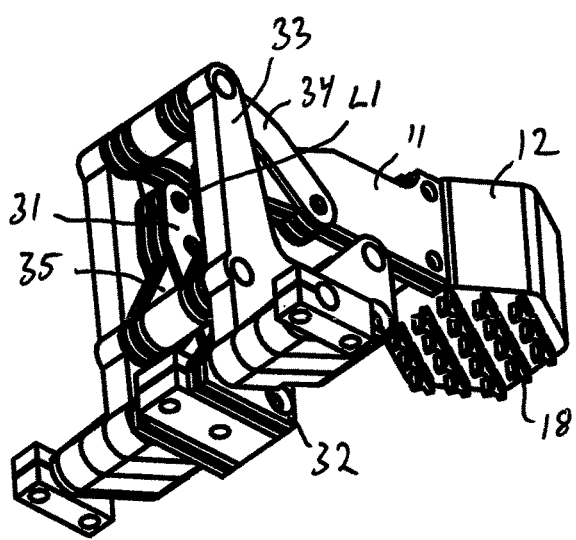

In FIG. 1, the harvesting arrangement 1 is shown with a crosscut tree trunk 4 (indicated with broken lines) held by the gripping members 2 with the tree trunk extending in the vertical direction. In FIG. 2, the harvesting arrangement 1 and a tree trunk 4 held therein are shown after the harvesting arrangement has laid the tree trunk down to a horizontal position. The maneuvering from vertical to horizontal position is carried out by means of a power member 9 in the form of a hydraulic cylinder, which is adapted to turn the part 1a of the harvesting arrangement in which the trunk is held in relation to the other part 1b of the harvesting arrangement that is attached to the crane of the forest vehicle. With respect to the parts described so far, the harvesting arrangement 1 is of conventional design.

The harvesting arrangement 1 comprises a marking device 10 for applying an identification marking, for instance in the form of a suitable code, on the end surface 4a of a crosscut end of a tree trunk 4 held by the gripping members 2. Thus, a log to be formed from a tree trunk 4 that is processed by means of the harvesting arrangement 1 may be provided with an identification marking by means of this marking device 10. The identification marking is applied on the frontal end surface of the log before the log is cut off from the tree trunk 4 and allowed to fall to the ground from the harvesting arrangement 1. The identification marking is suitably associated to established and stored information as to the growth location of the tree from which the log is obtained, for instance in a manner described in WO 99/23873 A1, so as to make it possible to determine the place of origin of a marked log with the aid of the marking. In connection with the felling, information concerning the place of origin, quality, size, seller, buyer etc. of the log can be stored associated to the identification marking, in which case such information can be retrieved in connection with a later identification of the log. The identification marking can also be utilized in order to follow the movement of the log from the felling to the final customer.

Figure 7A:
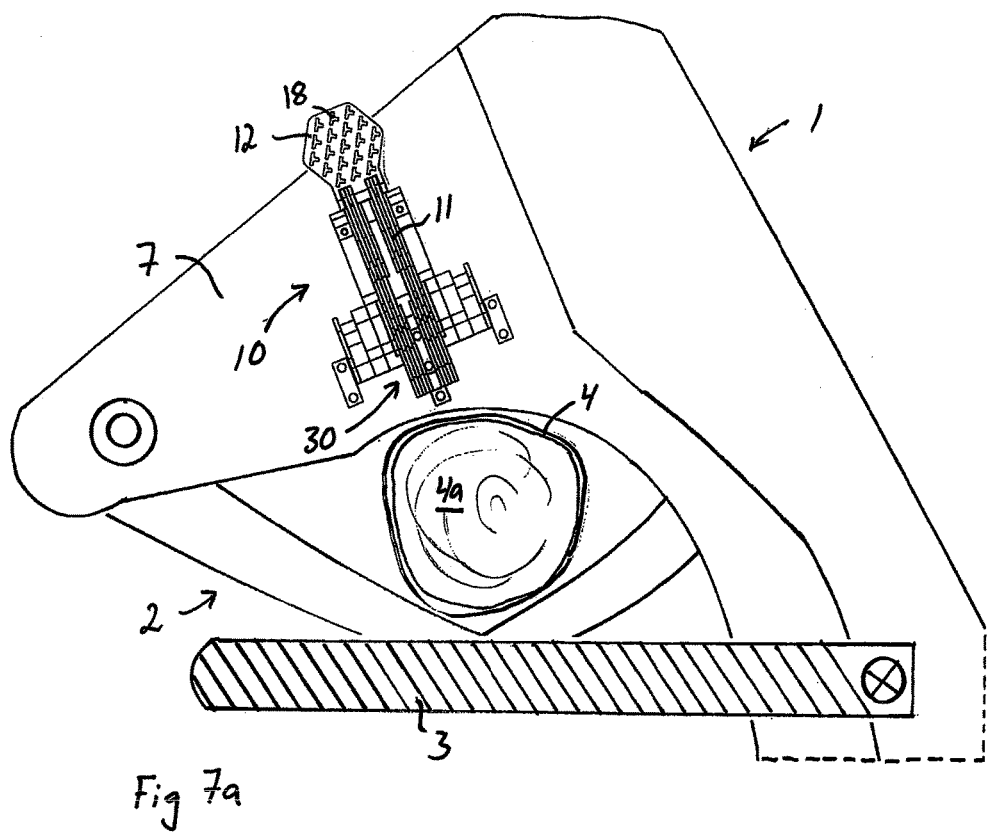
FIG. 7a is a planar view from below of the harvesting arrangement of FIG. 1, as seen with the striking arm of the marking device in the resting position.
Figure 7B:
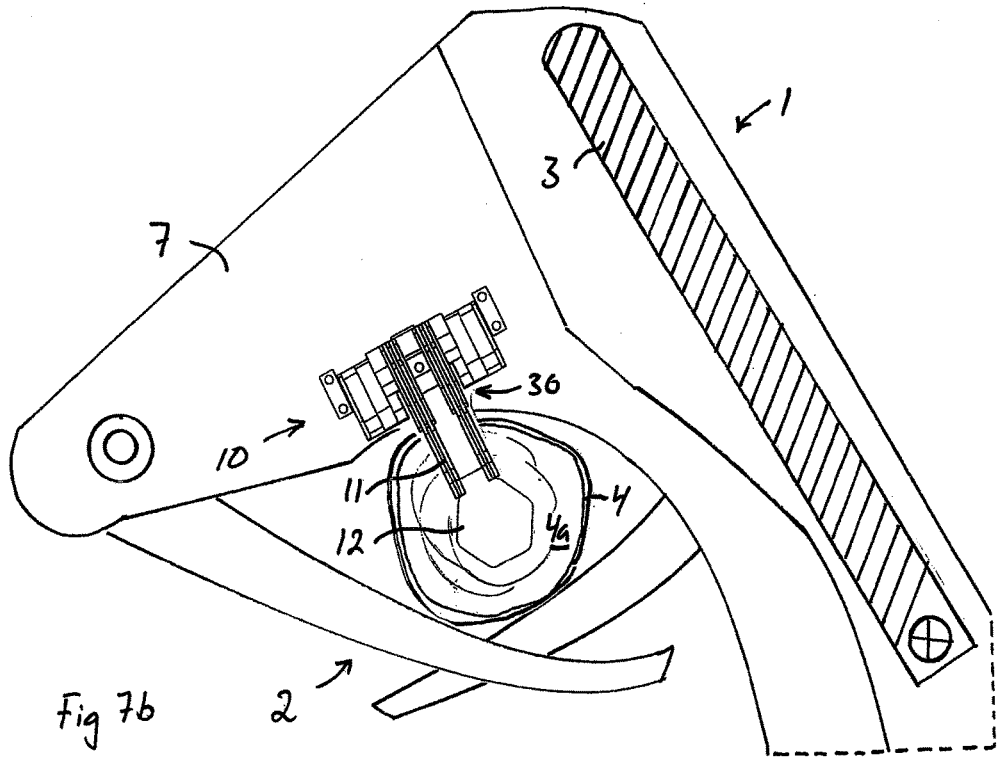
FIG. 7b is a planar view from below of the harvesting arrangement of FIG. 1, as seen with the striking arm of the marking device in the striking position.

The location of the marking device 10 in relation to the cutting member 3 of the harvesting arrangement is schematically illustrated in FIG. 1 with a block drawn with broken lines. As appears from FIG. 1, the marking device 10 is located above and close to the cutting member 3. The location of the marking device 10 in relation to the cutting member 3 of the harvesting arrangement is also illustrated in FIGS. 7a and 7b.

The marking device 10 comprises a striking arm 11 provided with a striking head 12 at its outer free end. The marking device 10 also comprises actuating means 20 for actuating the striking arm 11 and a link arrangement 30, through which the actuating means 20 are arranged to act on the striking arm 11. The striking arm 11 is through the link arrangement 30 movably connected to a base 7 included in the harvesting arrangement, which base is arranged near and just above the cutting member 3.

The striking arm 11 is at its inner end pivotally connected to a first link 31 of the link arrangement 30 through a first joint L1, which defines a first pivot axis V1. The first link 31 is pivotally connected to the base 7 through a second joint L2, which defines a second pivot axis V2, and it is pivotable about this second pivot axis V2 under the effect of the actuating means 20. The second pivot axis V2 is arranged at a distance from and extends in parallel with the first pivot axis V1. The striking arm 11 is pivotable about the first pivot axis V1 under the effect of the actuating means 20 and the link arrangement 30 from a resting position (see FIGS. 3a, 4a, 5a, 6a and 7a) to a striking position (see FIGS. 3c, 4c, 5c, 6c and 7b), via an intermediate position (see FIGS. 3b, 4b, 5b and 6b), so as to thereby allow the striking head 12 to hit against the end surface 4a of a crosscut end of a tree trunk 4 held by the gripping members 2 in order to apply a marking on said end surface. The first link 31 is arranged to pivot about the second pivot axis V2 under the effect of the actuating means 20 during such a movement of the striking arm 11 from the resting position to the striking position, whereby said first joint L1 and thereby the first pivot axis V1 is moved outwards from the base 7 so that the distance between the first pivot axis V1 and the base 7 increases when the striking arm 11 is moved under the effect of the actuating means 20 and the link arrangement 30 from the resting position to the striking position. Said pivot axes V1, V2 extend perpendicularly to the longitudinal direction of a tree trunk 4 held by the gripping members 2.

In the illustrated embodiment, the first link 31 is at one of its ends articulately connected to the striking arm 11 through said first joint L1 and at its other end articulately connected to a holder 32 through said second joint L2, which holder is fixedly connected to the base 7. The actuating means 20 are arranged to act on a lever link 33 included in the link arrangement 30, which lever link is articulately connected to the base 7 through a third joint L3 and pivotable under the effect of the actuating means 20 about a third pivot axis V3 defined by the third joint L3. The third pivot axis V3 is arranged at a distance from and extends in parallel with the first pivot axis V1 and the second pivot axis V2. The lever link 33 is connected to the striking arm 11 through a first connecting link 34, which at one of its ends is articulately connected to the lever link 33 through a fourth joint L4 and its other end is articulately connected to the striking arm 11 through a fifth joint L5 located between the two ends of the striking arm, i.e. between the striking head 12 and said first joint L1. Furthermore, the lever link 33 is connected to the first link 31 through a second connecting link 35, which at one of its ends is articulately connected to the lever link 33 through a sixth joint L6 located between said third joint L3 and said fourth joint L4, and which at its other end is articulately connected to the first link 31 through a seventh joint L7 located between said first joint L1 and said second joint L2.

In the illustrated embodiment, the actuating means 20 comprise two hydraulic cylinders 20a, 20b (see FIGS. 5b and 6b), which are arranged in parallel with each other on either side of the striking arm 11. The respective hydraulic cylinder 20a, 20b has a cylinder part 21 which is articulately connected to the base 7 and a piston rod 22 which is articulately connected to the lever link 33 through an eighth joint L8. The hydraulic cylinders could alternatively be arranged in the opposite direction, i.e. with the piston rod 22 connected to the base 7 and the cylinder part 21 connected to the lever link 33. The actuating means 20 are omitted in FIGS. 3a-3c, 4a, 4c, 5a, 5c, 6a, 6c, 7a and 7b.

The striking arm 11 with advantage comprises two or more mutually parallel shanks 11a, 11b, as illustrated in FIGS. 5a-5c and FIGS. 6a-6c. In the corresponding manner, the respective link 31, 33, 34, 35 of the link arrangement 30 with advantage comprises two or more mutually parallel shanks, as illustrated in FIGS. 5a-5c and FIGS. 6a-6c. The shanks of the striking arm 11 and the links 31, 33, 34, 35 suitably have the form of elongated metallic plates arranged side by side with the main surfaces of the plates facing each other, as illustrated in FIGS. 5a-5c, 6a-6c, 7a and 7b. The striking arm 11 and the link arrangement 30 are hereby given a stable construction.

When they are in the resting position, the striking arm 11 and the striking head 12 are out of the way of a tree trunk 4 held by the gripping members 2 and the tree trunk may then be advanced forwards along the harvesting arrangement 1 by the feeding means 5 without being obstructed by the striking arm 11 or the striking head 12.

The striking head 12 is provided with marking means for achieving the desired identification marking on a log. The marking means may be of any suitable type. The marking means suitably comprise several individually adjustable marking members 18, each of which being selectively rotatable between different setting position or selectively adjustable between an active marking position, in which the marking member 18 is arranged to apply a mark on the end surface 4a of a tree trunk hit by the striking head 12, and an inactive position, in which the marking member 18 is prevented from applying a mark on the end surface 4a or a tree trunk hit by the striking head. The mark in question could for instance be an indentation or a dot of paint or ink. The marking device 10 is suitably provided with automatically controlled setting means configured to set the positions of said adjustable marking members 18, preferably under the control of an electronic control unit, so as to thereby make it possible to automatically vary the identification marking achieved by the marking members. The striking head 12 could also be provided with means for attaching an information carrier to the end surface 4 of a tree trunk. Such an information carrier could be provided with the identification marking and/or any other desired information and could for instance consist of an RFID tag (RFID=radio frequency identification), for instance in the form of a transponder, an electronic chip, a label etc. The RFID tags may for instance be provided on a reel actuated by suitable feeding means provided in the marking device.

The striking head 12 is preferably provided with one or more marking members 18 for applying a marking by stamping or punching on the end surface 4a of a tree trunk 4 when the striking head 12 hits against said end surface. In this case, the respective marking member 18 is in its active marking position arranged to penetrate into the end surface 4a of a tree trunk hit by the striking head 12 so as to achieve an indentation in the end surface 4a, and in its inactive position prevented from penetrating into the end surface of a tree trunk hit by the striking head. The respective marking member 18 may be movable to and fro between an advanced position corresponding to the above-mentioned active marking position and a retracted position corresponding to the above-mentioned inactive position. The respective marking member 18 may have a rounded outer end so as to facilitate the withdrawal of the marking member from the end surface 4a of a tree trunk hit by the striking head 12.

The striking head 12 may also be provided with a marking member in the form of a valve which is configured to emit paint or ink when the striking head 12 hits against the end surface 4a of a tree trunk so as to thereby apply a dot of paint or ink on the end surface of the tree trunk.

In the illustrated embodiment, the cutting member 3 consists of a pivotally arranged saw sward having a saw chain extending around its periphery. The saw sward 3 is in a conventional manner arranged in a so-called saw box 8, which is intended to protect the saw sward and its driving equipment from impacts. The saw sward 3 is in a conventional manner pivotable from a resting position inside the saw box 8 (see FIG. 7b) to a swung-out position (see FIG. 7a), in which the saw sward 3 protrudes outside the saw box. The marking device 10 is so designed that the striking arm 11 may be moved from its resting position to its striking position and then back to the resting position during the short period of time when the saw sward 3 is in its resting position inside the saw box 8. Hereby, the striking arm 11 is allowed to execute its striking motion before the saw sward 3 is returned to the swung-out position.

When the piston rods 22 of the hydraulic cylinders 20a, 20b of the actuating means are retracted, the striking arm 11 is swung back and is in the resting position illustrated in FIGS. 3a, 4a, 5a and 6a. In this retracted resting position, the marking device 10 is out of the way of a tree trunk 4 held by the gripping members 2 and the tree trunk may then be advanced forwards along the harvesting arrangement 1 by the feeding means 5 without being obstructed by the marking device. In this resting position, the marking device 10 is located above the plane in which the saw sward 3 executes its pivoting motion and is consequently out of the way of the saw sward. When the piston rods 22 are pushed forwards, they exert a force on the striking arm 11 and the first link 31 via the lever link 33 and the connecting links 34, 35, and the striking arm and the first link will hereby pivot forwards about the first pivot axis V1 and the second pivot axis V2, respectively, from the resting position shown in FIGS. 3a, 4a, 5a, 6a and 7a to the intermediate position shown in FIGS. 3b, 4b, 5b and 6b. By this pivoting motion of the first link 31 about the second pivot axis V2, the first pivot axis V1 is moved outwards and forwards so that the distance between the first pivot axis V1 and the base is increased. In connection with a continued advancing of the piston rods 22, the piston rods will exert a force on the striking arm 11 via the lever link 33 and the first connecting link 34, which makes the striking arm pivot forwards further about the first pivot axis V1 from the intermediate position shown in FIGS. 3b, 4b, 5b and 6b to the striking position shown in FIGS. 3c, 4c, 5c, 6c and 7b. The striking head 12 hereby hits against the end surface 4a of the tree trunk 4 so that a marking is applied on said end surface. The piston rods 22 are thereafter retracted so that the striking arm 11 and the link arrangement 30 are returned from the striking position illustrated in FIGS. 3c, 4c, 5c, 6c and 7b to the resting position illustrated in FIGS. 3a, 4a, 5a, 6a and 7a.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:
1. A marking device for applying a marking on an object, the marking device (10) being intended to be mounted to a base (7) and comprising:
   a striking arm (11) provided with a striking head (12) at its outer free end;

actuating means (20) arranged for actuating the striking arm (11); and a link arrangement (30), through which the actuating means (20) are arranged to act on the striking arm (11), wherein:

the striking arm (11) is movably connected to the actuating means (20) through the link arrangement (30);

separately from being connected to the actuating means (20), the striking arm (11) at its inner end is pivotally connected to a first link (31) through a first joint (L1) which defines a first pivot axis (V1);

the first link (31) is pivotally connected to the base (7) through a second joint (L2) which defines a second pivot axis (V2), the first link (31) being pivotable about this second pivot axis (V2) by the actuating means (20);

the second pivot axis (V2) extends in parallel with the first pivot axis (V1);

the striking arm (11) is pivotable about the first pivot axis (V1) by the actuating means (20) and the link arrangement (30) from a resting position to a striking position to allow the striking head (12) to hit against an object to apply a marking on the object;

the first link (31) being arranged to pivot about the second pivot axis (V2) by the actuating means (20) during movement of the striking arm (11) from the resting position to the striking position;

the first pivot axis (V1) being movable outwardly from the base (7) with the distance between the first pivot axis (V1) and the base (7) increasing when the striking arm (11) is moved by the actuating means (20) and the link arrangement (30) from the resting position to the striking position; and the striking arm (11) being separately pivotal about the first pivot axis (V1) with respect to the link (31) from pivoting of the link (31) about the second pivot axis (V2) with respect to the base (7).

2. A marking device according to claim 1, wherein said first link (31) at one of its ends is articulately connected to the striking arm (11) through said first joint (L1) and at its other end is articulately connected to a holder (32) through said second joint (L2), which holder is fixedly connected to the base (7).

3. A marking device according to claim 1, wherein the actuating means (20) are arranged to act on a lever link (33) included in the link arrangement (30), which lever link is articulately connected to the base (7) through a third joint (L3) and pivotable under the effect of the actuating means (20) about a third pivot axis (V3) defined by the third joint (L3).

4. A marking device according to claim 3, wherein the lever link (33) is connected to the striking arm (11) through a first connecting link (34), which at one of its ends is articulately connected to the lever link (33) through a fourth joint (L4) and at its other end is articulately connected to the striking arm (11) through a fifth joint (L5) located between the two ends of the striking arm.

5. A marking device according to claim 4, wherein the lever link (33) is connected to the first link (31) through a second connecting link (35), which at one of its ends is articulately connected to the lever link (33) through a sixth joint (L6) located between said third joint (L3) and said forth joint (L4), and which at its other end is articulately connected to the first link (31) through a seventh joint (L7) located between said first joint (L1) and said second joint (L2).

6. A marking device according to claim 1, wherein the actuating means (20) comprise two hydraulic cylinders (20a, 20b) arranged in parallel with each other on either side of the striking arm (11).

7. A marking device according to claim 1, wherein the striking arm (11) comprises two or more mutually parallel shanks (11a, 11b), which preferably have the form of elongated plates.

8. A marking device according to claim 1, wherein the respective link (31, 33, 34, 35) of the link arrangement (30) comprises two or more mutually parallel shanks, which preferably have the form of elongated plates.

9. A marking device according to claim 1, wherein the striking head (12) is provided with one or more marking members (18) for applying a marking by stamping or punching on an object when the striking head (12) hits against the object.

10. A harvesting arrangement for tree harvesting comprising gripping members (2) for holding a tree trunk and a cutting member (3) for crosscutting a tree trunk held by the gripping members (2), wherein the harvesting arrangement (1) comprises a marking device (10) according to claim 1 for applying a marking on the end surface of a crosscut end of a tree trunk held by the gripping members (2).

11. A marking device according to claim 2, wherein the actuating means (20) are arranged to act on a lever link (33) included in the link arrangement (30), which lever link is articulately connected to the base (7) through a third joint (L3) and pivotable under the effect of the actuating means (20) about a third pivot axis (V3) defined by the third joint (L3).

12. A marking device according to claim 11, wherein the lever link (33) is connected to the striking arm (11) through a first connecting link (34), which at one of its ends is articulately connected to the lever link (33) through a fourth joint (L4) and at its other end is articulately connected to the striking arm (11) through a fifth joint (L5) located between the two ends of the striking arm.

13. A marking device according to claim 12, wherein the lever link (33) is connected to the first link (31) through a second connecting link (35), which at one of its ends is articulately connected to the lever link (33) through a sixth joint (L6) located between said third joint (L3) and said forth joint (L4), and which at its other end is articulately connected to the first link (31) through a seventh joint (L7) located between said first joint (L1) and said second joint (L2).

14. A marking device according to claim 13, wherein the actuating means (20) comprise two hydraulic cylinders (20a, 20b) arranged in parallel with each other on either side of the striking arm (11).

15. A marking device according to claim 3, wherein the actuating means (20) comprise two hydraulic cylinders (20a, 20b) arranged in parallel with each other on either side of the striking arm (11).

16. A marking device according to claim 15, wherein each said cylinder (20a, 20b) has a cylinder part (21) articulately connected to the base (7) and a piston rod (22) articulately connected through an eighth joint (L8) to the lever link (33) connected through the third joint (L3) to the base (7).

17. A marking device according to claim 15, wherein each said cylinder (20a, 20b) has a piston rod (22) articulately connected to the base (7) and a cylinder part (21) articulately connected through an eighth joint (L8) to the lever link (33) connected through the third joint (L3) to the base (7).

18. A marking device according to claim 7, wherein the respective link (31, 33, 34, 35) of the link arrangement (30)

comprises two or more mutually parallel shanks, which preferably have the form of elongated plates.

19. A marking device according to claim 6, wherein the striking arm (11) comprises two or more mutually parallel shanks (11a, 11b), which preferably have the form of elongated plates.

20. A marking device according to claim 19, wherein the respective link (31, 33, 34, 35) of the link arrangement (30) comprises two or more mutually parallel shanks, which preferably have the form of elongated plates.

\* \* \* \* \*